United States Patent [19]
Schmidt

[11] Patent Number: 5,243,739
[45] Date of Patent: Sep. 14, 1993

[54] TWO PIECE CABLE TERMINATION SOCKET ASSEMBLY

[76] Inventor: Don F. Schmidt, 326 Eastdale Dr., #4, Bismarck, N. Dak. 58501

[21] Appl. No.: 755,290

[22] Filed: Sep. 5, 1991

[51] Int. Cl.$^5$ .............................................. F16G 11/04
[52] U.S. Cl. ................................. 24/135 R; 24/136 R
[58] Field of Search ............ 24/115 M, 136 R, 135 R, 24/135 A, 136 K, 136 L; 403/211, 374

[56] References Cited

U.S. PATENT DOCUMENTS

| | | |
|---|---|---|
| 421,328 | 2/1890 | Strohback . |
| 1,379,311 | 5/1921 | Page . |
| 1,622,110 | 3/1926 | Haworth . |
| 2,085,333 | 6/1937 | Reyholds . |
| 3,257,499 | 6/1966 | Broske . |
| 3,905,711 | 9/1975 | Rogers . |
| 4,536,921 | 8/1985 | Brendel et al. . |
| 4,561,154 | 12/1985 | Briscoe et al. . |
| 4,602,891 | 7/1986 | McBride . |
| 4,718,788 | 1/1988 | Briscoe . |

*Primary Examiner*—James R. Brittain
*Attorney, Agent, or Firm*—Kinney & Lange

[57] ABSTRACT

A self locking cable end termination socket assembly has a one-piece tapered wedge as a locking device for a cable that fits into a housing with two parts that are locked together. The wedge and a cable looped over the wedge fit within an interior opening in the housing. When the cable is tightened, the wedge tightens against surfaces defining the opening in the housing and wedges in place. The two housing parts include a saddle and a cap which fit together and are held in a fixed position with interlocking members. The cap has a knock-off lug that, when hit with sufficient force, such as by using a weight on an end of a cable to form a pendulum ram, will release from the saddle, making removal of the wedge and the cable greatly simplified.

12 Claims, 5 Drawing Sheets

TWO PIECE CABLE TERMINATION SOCKET ASSEMBLY

BACKGROUND OF THE INVENTION

The present invention relates to a cable termination socket for large diameter cables that has a two piece socket housing, which, when assembled, will receive a wedge as a locking device. The housing can be disassembled into its two pieces to permit removal of the wedge.

Large diameter wire ropes or cables used in the mining industry, for example, utilize cable termination sockets that have wedges to lock the cable in place at the present time. Termination sockets are used to connect the end of cables to equipment, such as dragline buckets. A typical prior art cable termination socket is shown in U.S. Pat. No. 3,905,711. That termination socket has a specific type of wedge that wedges the wire rope in place in a housing. Other devices merely use a one-piece socket housing and a wedge of fixed shape that wedges the cable against interior surfaces of the housing. Another type of termination socket is shown in U.S. Pat. No. 1,622,110, which has a simple wedge center portion that wedges a cable within an outer housing. An auxiliary wedge is also used for holding the cable in place.

One standard method of removing cable ends and wedges from one-piece cable end sockets at most U.S. surface mines today uses the explosive impact of a projectile fired from a cannon blasting the wedge from the cable socket housing. Another method is to cut the cable live end off at the socket and disconnect the cable socket from the bucket or tool. The cable socket assembly is then transported to the mine shop where it is placed in a special holding jig and the wedge is pressed out with a large hydraulic press or hydraulic jack.

The cable needs to be cut at three locations before the wedge can be extracted from the one-piece cable socket when using either the cannon or hydraulic press method. When using the cannon method, there is a need for some type of heavy equipment to back up the cannon when it discharges the projectile against the wedge.

There is also a need of a primer cord, detonator and a certified shooter to blast the wedge from the one-piece cable socket when a cannon is used. The methods used today by surface mining companies for removing cable retaining wedges from one-piece cable sockets is dangerous because of the resultant force required to remove the wedge from the one-piece cable socket. If there is danger to personnel, equipment, parts and machinery.

There are a large number of excavating machines (draglines and shovels) using cables of sizes of 2 inches in diameter up to 5-5½ inches in diameter that now require the cannon or hydraulic press method to remove the wedge from the one-piece cable socket housing, due to the high tension loads applied to the cables, which causes the wedges to seat almost permanently. The larger excavating machines have a down time cost of $5,000.00 or more per hour in lost production, plus the labor and equipment charge cost. Changing out a set of cables on small dragline excavators may take two hours plus, and on the larger draglines excavators changing the cable termination sockets may take over eight hours when the one-piece cable socket housings and wedges are used.

Attempts have been made to solve this problem, including clamps such as those shown in U.S. Pat. Nos. 4,561,154 and 4,602,891. These patents disclose termination sockets that are made in two parts. In U.S. Pat. No. 4,602,891 the socket housing has a U-shaped housing over which a cap fits. The cap has tracks that slide on flanges to tighten down onto a cable and wedge in the housing. Other sockets which use special wedges or housings include U.S. Pat. No. 4,536,921. The varied conditions that are encountered during the removal of the cable from a cable termination socket continues to be a problem.

Typical rope type cable termination sockets are shown in U.S. Pat. Nos. 1,379,311 and 2,085,333. In addition, U.S. Pat. No. 4,718,788 shows a cable termination socket that has an equalizer arrangement.

A rope holder that has an expanding wedge is also shown in U.S. Pat. No. 4,218,328, and an explosively operated wedge for obtaining the wedging force is shown in U.S. Pat. No. 3,257,499.

The present invention of a two piece cable termination socket housing permits cable and wedge removal in a simplified manner after the cable has been cut once. The housing parts will separate from an impact that can be delivered by a pendulum ram, which is relatively easy to operate. The wedge thus can be released from the base portion of the socket housing.

SUMMARY OF THE INVENTION

The present invention relates to a cable termination socket assembly, including a housing with a base or saddle portion that will receive a cable, and a cap that fits on the saddle portion. The cap is latched in place with interlocking lugs and a collar on the cap that encircles one end of the saddle portion. A cable then is looped through a tapered interior opening of the housing defined by the saddle portion and the cap or cover. The interior opening is covered by the cap. A wedge having tapered edges which fit within the tapered surfaces of the interior opening of the socket housing is provided. A cable is dead-ended or clamped onto the cap at the small end of the opening in the housing and is looped over the wedge, with a live end of the cable extending out the small end of the tapered opening along the bottom wall to form a cable loop. The wedge is placed into the cable loop, the live end of the cable is tightened, and the wedge is pulled into place, wedging tightly inside the assembled housing.

The cap has a projection at the top which can be used as an impact receiving projection from a heavy pendulum ram swinging from the line of a crane, when the cable is to be removed. When the cable is to be removed, the cable is cut once at the larger end of the wedge, and then the housing cap is removed with a solid blow from a pendulum ram or another impact delivering device, which separates the housing sections, namely the saddle portion and the cap, and permits easy removal of the wedge. Subsequent reassembly with a new cable in place in the housing is then easily done.

Substantially less labor is involved in changing cables and the use of a cannon or large hydraulic press is not required. The cap is securely held in place on the saddle portion during use by the tension in the live end of the cable, in that the loads on the cable tend to draw the housing parts together. The cap does not wedge onto the saddle portion with the full force of the cable load and can be removed with a ram blow.

DESCRIPTION OF THE PREFERRED EMBODIMENTS

Figure 3:
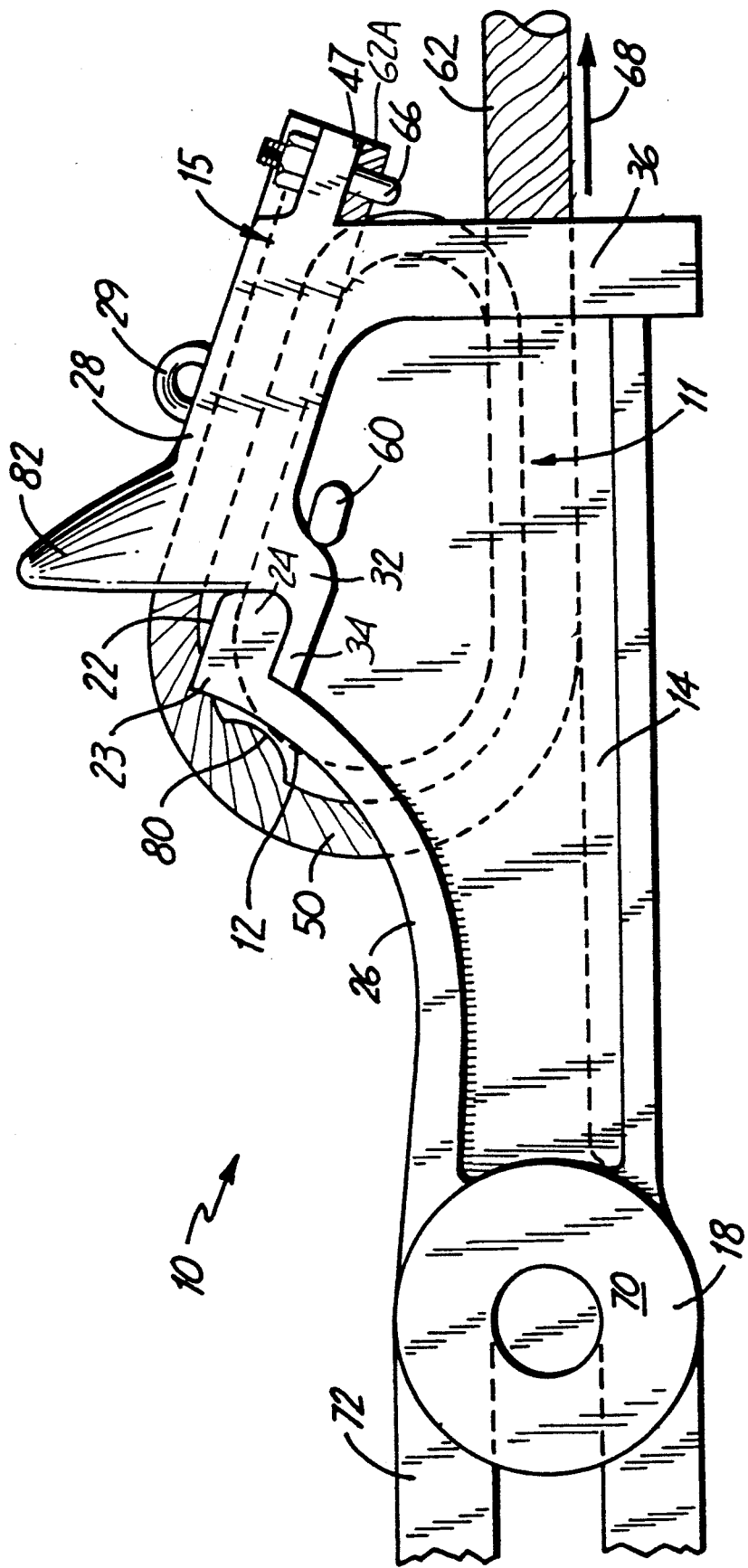
FIG. 3 is a side elevational view of the termination socket housing and wedge formed into the cable end termination socket assembly.
Figure 4:
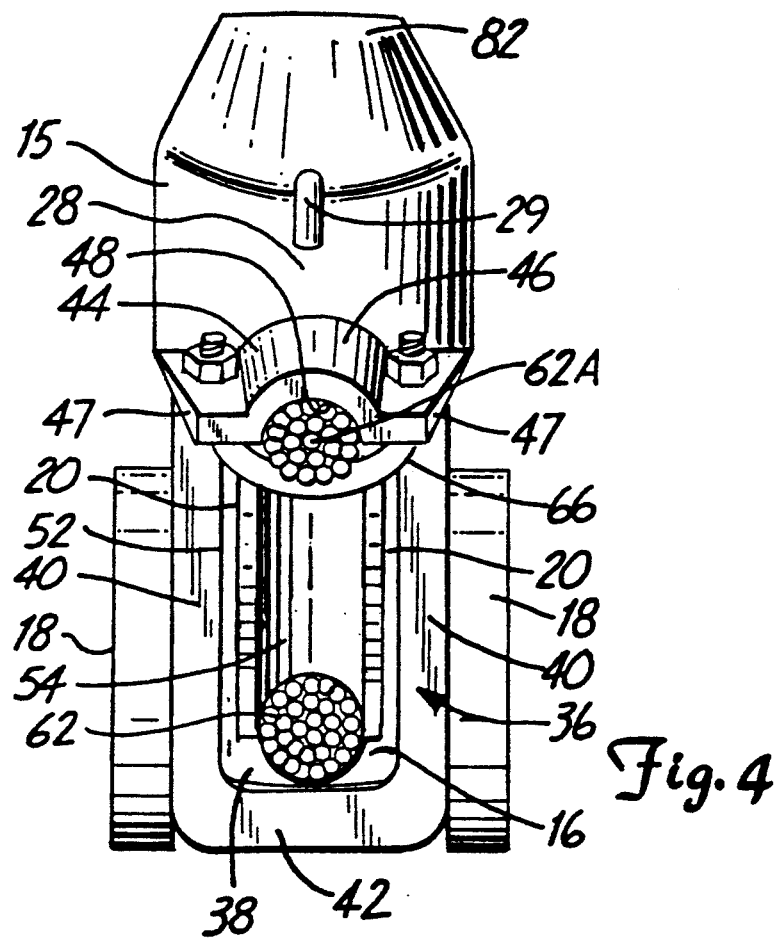
FIG. 4 is an end elevational view of the cable end termination socket assembly of FIG. 3.

As shown in FIG. 3, the cable termination socket assembly indicated generally at 10 comprises a socket housing assembly 11, and a wedge 12. The socket housing assembly 11 includes a housing base or saddle portion 14, and a housing cap portion 15, which housing portions are latched together in use for holding them as an assembly.

The saddle portion 14 has a base or bottom wall 16, and a pair of spaced parallel sidewalls 20. A pair of spaced apart hubs 18 are at one end of each sidewall. The hubs is are used for holding a pin for connecting to a digging bucket or other equipment, as will be explained. Sidewalls 20 form a generally U-shaped opening or receptacle 21 in combination with the base wall 16. The sidewalls 20 have tapering top edges 22, extending from a high point 23 and sloping toward a small end 25 opposite the hubs 18. A lug 24 is formed on each of the side walls adjacent the highest point 23. The sidewalls 20 have curved rear edges 26 leading from the hubs 18 up to the point 23 at the end of top edges 22 of the walls 20.

The cap 15 includes a top wall 28 which is also formed as a downward opening saddle with spaced sidewalls 30 that straddle and can be placed on the outside of the sidewalls 20 of saddle portion 14 at the small end 25. The cap 15 further includes a pair of depending flanges 32 joined to the sidewalls 30, that have lugs 34 at the rear end thereof, which is the end positioned toward the hubs 18, and which is at the large end of a tapered wedge opening formed by the saddle portion when the cap 15 is in place. The opposite end of the cap 15 from flanges 32 and lugs 34 has an integral collar 36 which has a central opening 38 defined by sidewalls 40 that, in turn, are joined by a heavy bottom wall 42, and by an overlying wall portion 44 extending from and forming part of top wall 28. The opening 38 is of size to receive the small end 25 of the saddle portion 14. The collar 36 encircles the sidewalls 20 and base wall 16 of the saddle portion.

The top wall portion 44 of the collar 36 forms an outwardly extending flange 46 that has a downwardly facing recess or groove 48 that is of size to receive a cable 62 that will be placed into the housing for termination. The flange 46 has lateral wings 47. The inner surface of the top wall of the cap 28 also has a continuation of recesses or grooves 48 for receiving a part of a cable, as can be seen in FIG. 3, for example. The top wall 28 also has a lifting loop or lug 29, attached thereto. When the cap 15 is in place on housing portion 14, the socket housing defines opening 21, which tapers from a large end at points 23 to small end 25.

A cable wedge 52 has a peripheral recess 54 of size to receive a cable to be attached to the housing, and, as can be seen, the wedge has a small end 56 and a large end 58. The surfaces defining the recess 54 and the edge surfaces of the wedge taper at an angle that is selected to wedge lock between bottom wall 16 of the saddle and the tapering inner surface of the upper wall 28 of the cap 15. The taper of the opening or receptacle 21 with cap 15 in place is about 24° as shown. The wedge taper is less, for example, about 17°.

Figure 1:
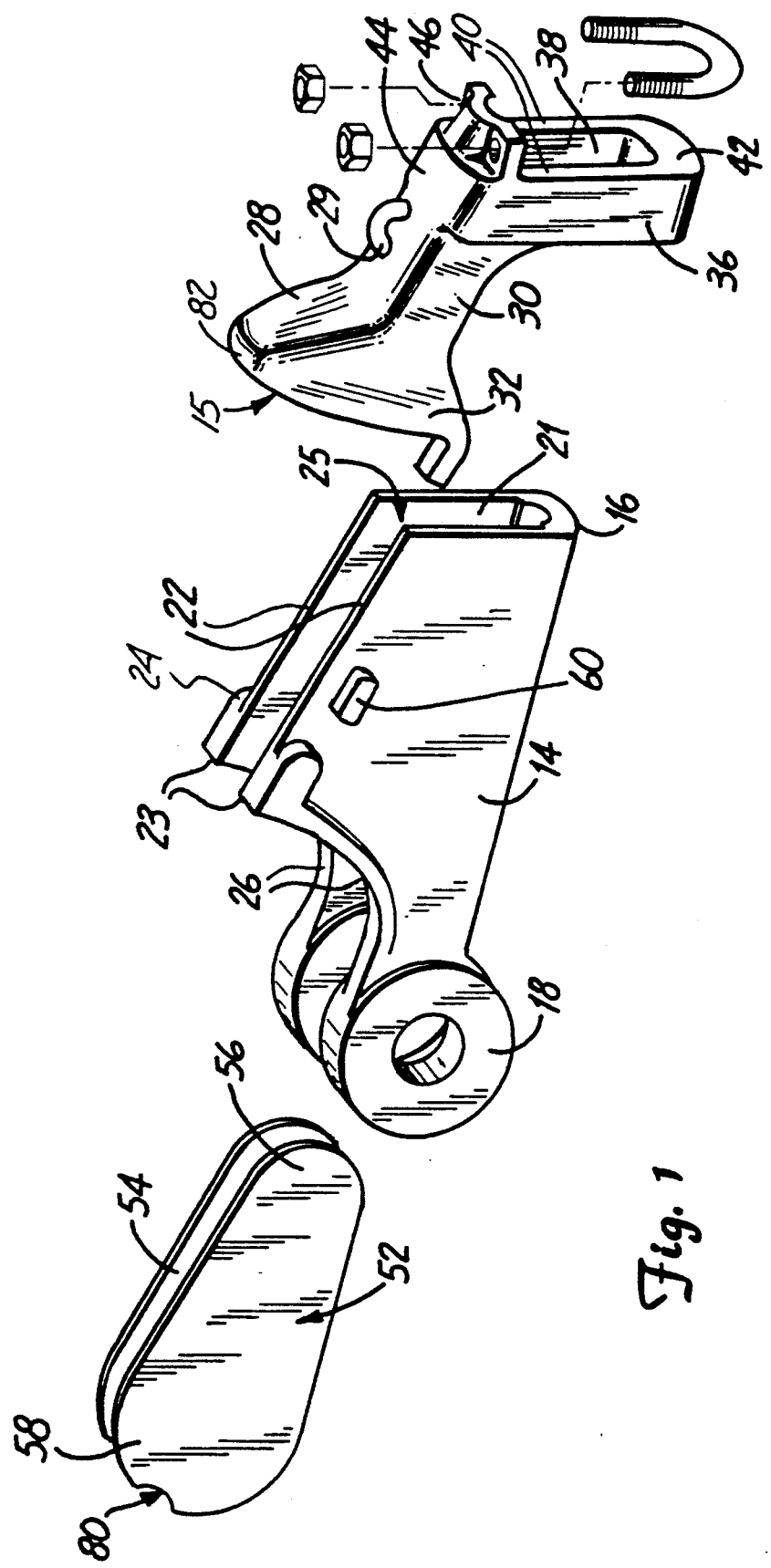
FIG. 1 is an exploded view of a cable end termination sock assembly made according to the present invention.
Figure 2:
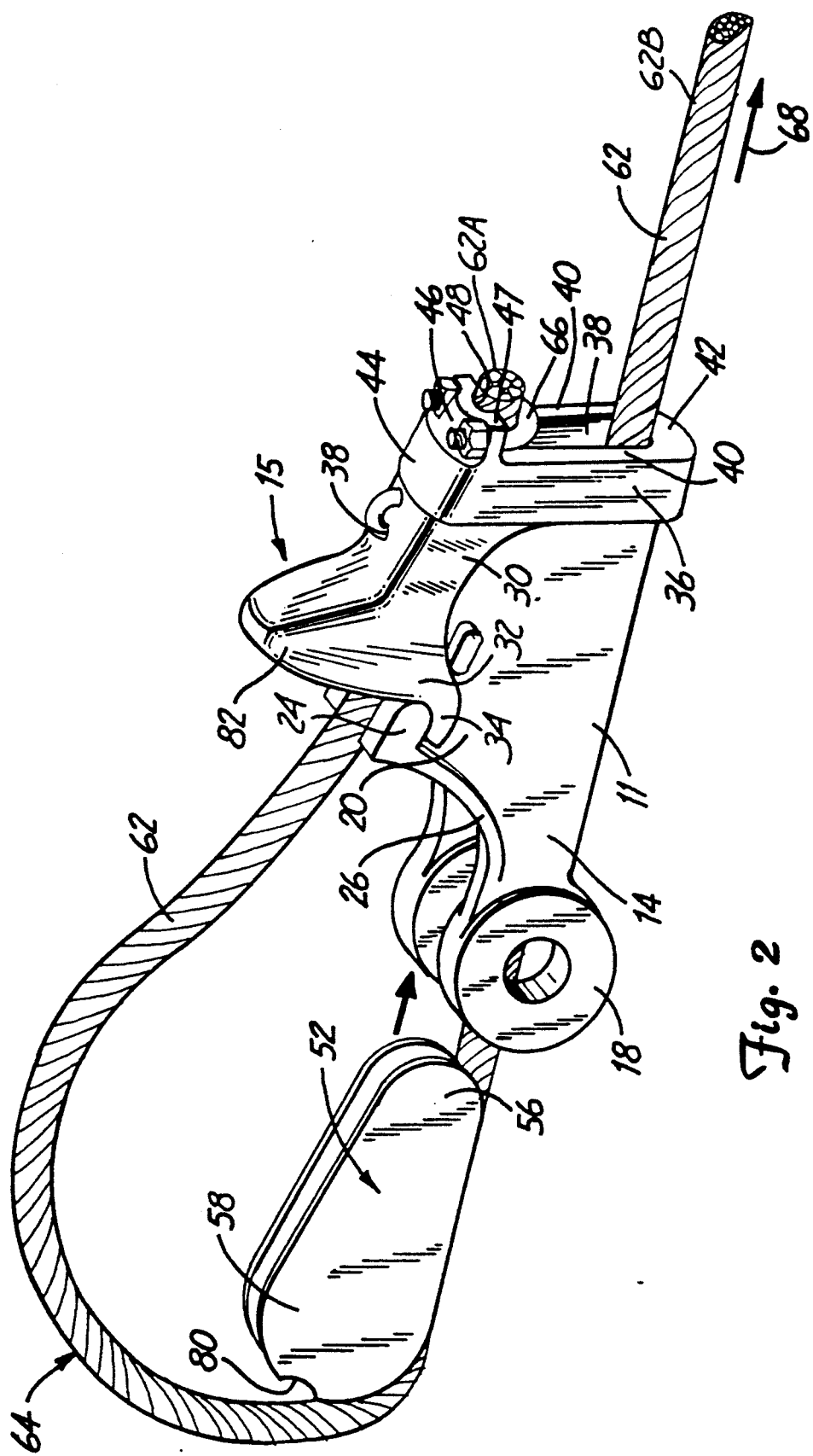
FIG. 2 is an exploded view showing a termination socket housing in an assembled condition, and illustrating a method of installing a wedge and cable into the termination socket housing.
Figure 5:
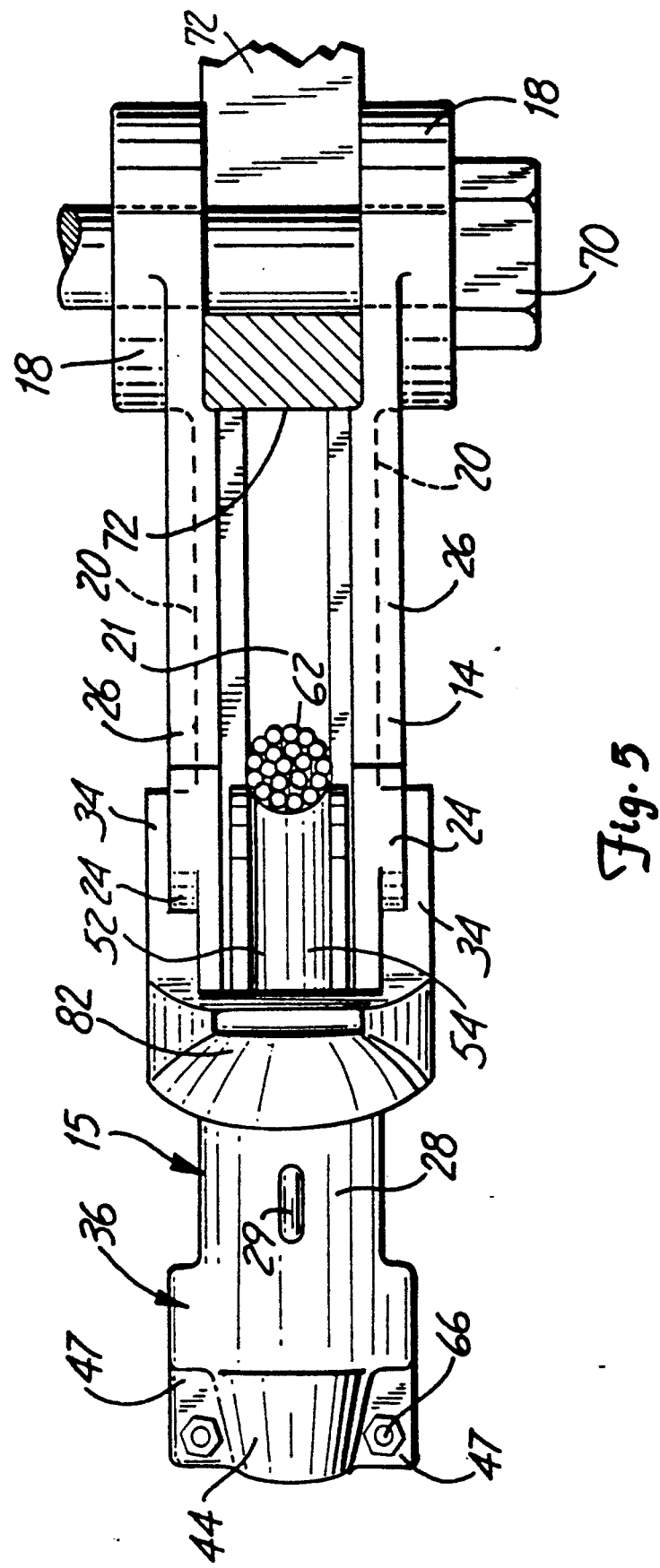
FIG. 5 is a top plan view of the assembly of FIG. 3.

The cap 15 will be assembled to place the lugs 34 of the flanges 32 under lugs 24 of the sidewalls 20 of saddle portion 14 to prevent movement of cap 15 away from base wall 16 of the housing, when the wedge is in place. The collar 36 will then also be in place surrounding the small end of the housing saddle portion 14, as shown in FIGS. 2, 3 and 5. The forces of wedging tending to separate the cap from the saddle portion are thus reacted back to the saddle portion.

Referring to FIG. 2, the assembly of the cable socket housing 11, including the cap 15 and the saddle portion 14, is placed onto a supporting surface such as the ground and a live cable shown at 62 is placed through the end opening 38 of the collar 36 of the cap. The cable is looped to make a fairly large loop indicated at 64, and the end 62A of the cable 62 is passed underneath the top wall 38 of the cap of the cable termination socket housing 11 and under the flange 46. A U-bolt 66 is then used for clamping the dead end 62A of the cable 62 into position and locking it securely to the cap 15. The U-bolt 66 passes through openings in the wings 47. The cable loop 64 then can be made smaller by pulling on live end 62B of the cable 62 and the wedge 52 is placed on the inside of the loop 64 with the lower part of groove 54 fitting over the live end 62B of the cable 62. The cable 62 then will be pulled to tighten the loop onto the wedge 52. The live end 62B of cable 62 extends through opening 38 of the collar 36. The hubs 18 are fastened to a bucket or tool or the housing 11 can be held in other ways, so the loop of cable 62 can be tightened. The wedge 52 then will move into the space between the hubs 18, and as the cable is tightened, will further move between the sidewalls 20 of the saddle. The lower side of the live end of cable 62 will rest against the base wall 16 of the saddle portion 14 of cable socket housing assembly and the upper side of the part of cable 62 held on the top of the wedge 52 will engage against the top wall 28 of the cap 15. The lugs 24 formed on each of the sidewalls 20 of the saddle portion, and the lugs 34 on the cap, will remain engaged and will prevent the housing cap 15 from lifting up. The collar 36 encircles the small end 25 of the saddle portion 14 and holds the side walls 20 together. Thus, the wedge 52 will very tightly wedge the cable in place. The dead end 62A of the cable 62 is secured to the housing cap 15 and tends to pull the cap to seat more tightly on housing saddle portion 14 as the live end 62B of the cable 62 is moved under power in direction indicated by arrow 68.

The wedge 52 tightens down and will securely seat while the cap 15 is retained in place by the lugs 24 and 34, and the collar 36. The socket termination assembly is thus ready to use.

A pin 70 is put through the openings of the hubs 18, as shown schematically in FIGS. 3 and 5, and a large clevice or other fitting 72 is held with the pin. The clevice or fitting will be attached to any excavating tool or bucket desired. The cable 62 can be used for carrying heavy loads, such as in strip mining or dragline work.

The curved sidewalls or edges 26 of the saddle portion can be reinforced with suitable ribs, and other reinforcements can be made as desired. The lugs 24 and 34 can be tapered slightly along their mating surfaces, to cam the cap toward the base or bottom wall 16 as the lugs move together if desired.

Removing wedges and cable from existing cable end termination socket assemblies requires three torch cuts to cut the cable in three places. Only one cut is needed with the present invention. To remove a cable from the cable end termination socket assembly 10, the cut is made of the cable at the cross notched area indicated at 80 (which opens to the groove in the wedge) at the large end of the wedge 52. This region is accessible because the walls 20 are curved down as shown by edges 26. The cable is cut through and, after this is done, the projection 82 on the cap 15 (at the large end of the wedge) is hit with a pendulum type ram that generates a substantial amount of impact force, and will drive the projection 82 and the cable termination assembly housing cap 15 away from the lugs 24, and slide the collar 36 from the small end 25 of the saddle portion 14 to release the cap 15. The dead end 62A of the cable 62 will be carried with the cap 15, (the cable was cut) and the cable end can be removed by removing the U-bolt 66. The wedge 52 can be removed from saddle portion 14 easily.

The cable socket housing 11 is then reassembled and is ready for a new cable utilizing the same wedge 52 as before.

The wedge 52 is a fixed size wedge, as is presently used with other types of termination sockets, and a very secure holding arrangement is obtained.

The parts can be large cast parts, or can be welded assemblies. The method of construction can be selected to suit the existing conditions.

Although the present invention has been described with reference to preferred embodiments, workers skilled in the art will recognize that changes may be made in form and detail without departing from the spirit and scope of the invention.

What is claimed is:

1. A cable termination assembly comprising a housing and a wedge, said wedge being tapered from a small end to a large end and said housing having a through opening with one large end and one small end and tapering at a desired angle, the through opening being of size to receive the wedge for wedging action, said housing comprising a saddle portion providing a bottom wall and a pair of substantially parallel sidewalls defining sides of the through opening, and a cap mounted on the saddle portion and overlying the bottom wall and forming a top wall at an inclination relative to the bottom wall to define the through opening, and interlocking means for holding the cap member in position on the saddle member, said interlocking means being disengagable upon movement of the cap in direction toward the small end of the through opening.

2. The cable termination assembly of claim 1, wherein said cap includes a collar having an opening that is larger than the end of the saddle portion that is adjacent the small end of the through opening, whereby said collar fits over the end of said saddle portion which is adjacent the small end of the through opening to restrain the sidewalls from separating.

3. The cable termination assembly as specified in claim 2, wherein said cap has cap sidewalls which straddle the sidewalls of the saddle portion and wherein said interlocking means include engaging lugs, comprising one lug on at least one sidewall of said saddle portion, and a cap lug on a corresponding cap sidewall, the saddle portion sidewalls having upper edges that curve downwardly from a high point adjacent the one lug on the saddle portion sidewall toward a second end of the saddle portion opposite from the small end of the through opening, and hub means for supporting a pin at the second end of the saddle portion.

4. The cable termination assembly of claim 2 wherein the saddle portion side walls are of lesser height at an end of the saddle portion opposite the small end of the through opening, and a pair of hubs on said side walls at the opposite ends, respectively, said hubs each having a bore therethrough for receiving a connecting pin for connection to excavating equipment.

5. The cable termination assembly of claim 1 and means to secure an end of a cable to the cap adjacent the small end of the through opening.

6. The cable termination assembly of claim 1 wherein said side walls have a maximum height above the bottom wall between the opposite ends of the saddle portion, the maximum height of said side walls defining the large end of the through opening.

7. The cable termination assembly of claim 6 wherein said side walls decrease in height above the bottom wall from said maximum portion toward an end of the side walls opposite from the small end of the through opening.

8. The cable termination assembly of claim 7 wherein the decrease in height of the side walls is such in relation to the size of the wedge, that the large end of the wedge is exposed on lateral sides when the wedge is received in the through opening to permit access to a cable wrapped around said wedge and held in said saddle portion.

9. The cable termination assembly of claim 8 wherein said wedge has a peripheral groove for partially receiving portions of a cable to be held by said wedge, said peripheral groove having a cross notch therein at the large end of the wedge for access to the cable for cutting a cable when the wedge is to be removed.

10. A cable termination assembly comprising a wedge having surfaces that taper from a small end to a large end, and a two piece housing for receiving said wedge, said housing having a passageway that tapers from a large end to a small end and is of size to receive at least a major portion of said wedge, and said housing comprising two portions, including a cap and a base portion having a bottom wall and side walls that are spaced apart to receive the wedge, and the cap having a top wall, the top and bottom walls tapering to provide surfaces that engage a cable on said wedge to lock the wedge in the housing, the top wall being completely removable from the base portion to permit access to the wedge, and the cap including a collar which encircles a part of one end of the base portion to keep the cap from separating from the base portion in a direction away from the bottom wall.

11. The cable termination assembly of claim 10 wherein the base portion includes the bottom wall which extends between and joins the side walls, and each of said side walls having a lug thereon extending on an exterior side of each of said side walls, respectively, and the lugs being positioned adjacent edges of the side walls spaced from the bottom wall, said cap having cap side walls that slide over the exterior surfaces of the side walls of the base portion, said cap having lugs thereon which fit underneath the lugs on the side walls to latch the cap in position.

12. A cable termination assembly comprising a wedge having surfaces that taper from a small end to a large end, and a two piece housing for receiving said wedge, said housing having a passageway that tapers from a large end to a small end and is of size to receive at least a major portion of said wedge, said housing comprising two portions including a cap and a base portion, said base portion having a bottom wall and side walls that are spaced apart to receive the wedge, the cap having a bottom wall, the top and bottom walls provide surfaces that engage a cable on said wedge to lock in the housing, each of said side walls having first lugs thereon extending on an exterior side of each of said side walls, respectively, the first lugs being positioned adjacent edges of the side walls spaced from the bottom wall adjacent the large end of the passageway, said cap having second lugs thereon which fit underneath the first lugs to removably latch the cap in position, said cap having a collar which substantially encircles a part of one end of the base portion to restrain the cap from separating from the base portion in a direction away from the bottom wall as the wedge moves to wedge a cable between the top and bottom walls.

* * * * *